Dec. 27, 1938.    L. KOUKAL    2,141,871
COMBINED BOTTLE STOPPER AND MEASURING DEVICE
Filed Sept. 25, 1937
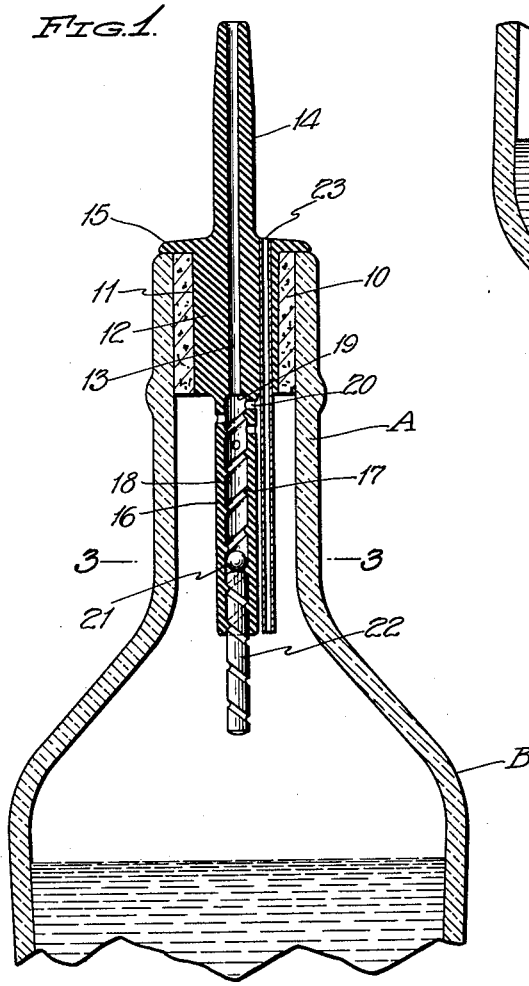
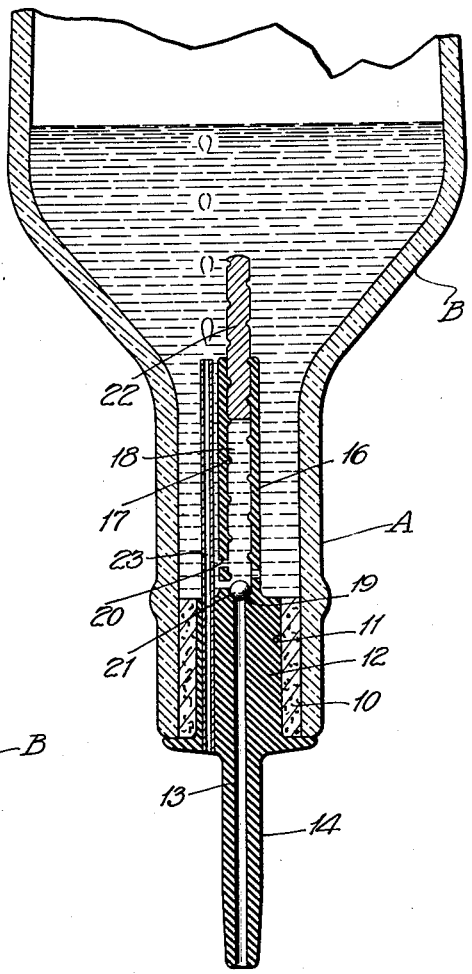
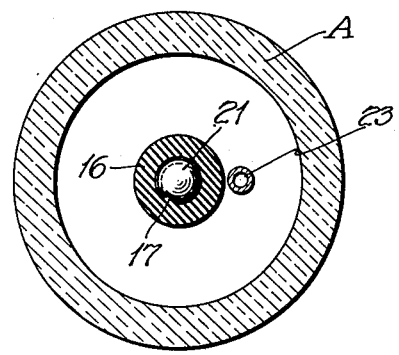
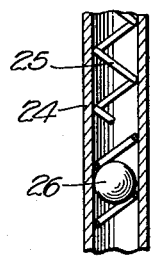
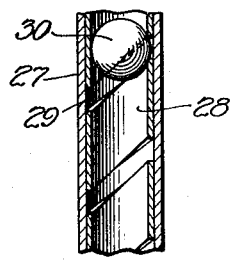
LOUIS KOUKAL.
INVENTOR.
BY Ely & Pattison
ATTORNEYS.
WITNESS:
G. Newton Lusby Patented Dec. 27, 1938

2,141,871

UNITED STATES PATENT OFFICE 2,141,871

COMBINED BOTTLE STOPPER AND MEASURING DEVICE

Louis Koukal, New York, N. Y.

Application September 25, 1937, Serial No. 165,723

9 Claims. (Cl. 221—147)

This invention relates to a combined bottle stopper and liquid measuring device and constitutes an improvement over a somewhat similar construction set forth in my co-pending U. S. patent application, Serial No. 162,961, filed September 9, 1937.

The main feature of the invention resides in a device which may be substituted for the stopper of a bottle to enable the automatic measuring of a predetermined quantity of liquid poured from the bottle upon inversion of the same, and which device will be found useful upon liquor bottles for expediting accurate measuring of liquor poured therefrom in the making of mixed drinks, and also upon liquid medicine bottles for pouring predetermined doses of medicine therefrom.

Another feature of the invention is to provide a dispensing stopper for bottles which may be adjusted to dispense various predetermined amounts of liquid upon each inversion thereof.

A further feature of the invention is the provision of a combined bottle stopper and liquid measuring device which is simple and inexpensive of construction, accurate in its measuring action, and which may be kept in a sanitary condition for interchangeable application to bottles containing different liquids.

Other objects of the invention will be apparent as the following specification is read in conjunction with the accompanying drawing, in which:

Figure 1 is a vertical sectional view through the neck end of a bottle showing my bottle stopper and automatic measuring device associated therewith, the bottle being shown in upright position.

Figure 2 is a view similar to Figure 1, but showing the bottle inverted and the valve member in closed position.

Figure 3 is an enlarged horizontal sectional view on the line 3—3 of Figure 1.

Figures 4 and 5 are detail vertical sectional views showing modified means of forming a spiral track for the ball valve member.

Referring to the drawing by reference characters, the numeral 10 designates a plug stopper which may be constructed of cork, rubber or other yieldable sealing material. The stopper 10 is provided with a central opening 11 in which is fitted a cylindrical body 12 having a bore 13 extending centrally therethrough and which bore opens at the tip end of the spout 14 formed integral with the body 12. The top of the body 12 is provided with an annular flange 15 which overlies the top of the plug stopper 10.

Integral with the body 12 and depending downwardly therefrom is a tubular extension 16, the said extension being in axial alinement with the bore 13. Whereas the body 12 and the integral parts 14 and 16 may be constructed of metal or other like material, I prefer to mold the same from hard rubber or similar composition.

Formed on the inner side of the tubular extension 16 and extending the length thereof is a spiral rib 17, which rib forms a spiral channel or track 18 along the length of the inner walls of the tubular extension. The inner diameter of the tubular extension 16 is greater than the diameter of the duct 13 and provided at the top or inner end of the tubular extension is a ball valve seat 19. Inlet passages 20 are provided in the walls of the tubular extension adjacent the valve seat 19 for the admission of liquid from a bottle to pass into the tubular extension and out through the duct 13 upon inversion of a bottle on which the device may be used.

Disposed within the tubular extension 16 for passage over the spiral groove or track 18 is a metal ball 21 of a size to snugly fit against the ball valve seat 19 when the ball valve member is in closing position. Threaded in the lower end of the tubular extension 16 is an adjustable stop member 22, which limits the return movement of the ball valve member 21 from a closing position to its normal position. The stop member 22 is provided with spiral threads for threading engagement with the spiral rib 17 provided on the inner walls of the tubular extension 16.

Extending through the body 12 and fixedly secured thereto is an air vent tube 23 which admits air into a bottle during the pouring of liquid contents therefrom.

In the drawing I have illustrated my combined stopper and liquid measuring device as being fitted into the neck A of a bottle B, and in Figure 1 the bottle B is shown in a normal upright position, at which time the ball valve member 21 rests against the inner end of the stop member 22. Assume that it is desired to pour out a predetermined amount of the liquid in the bottle B, whereupon the operator inverts the bottle B to the position shown in Figure 2, at which time liquid will pass from the bottle B through the inlet passages 20 into the bore 13 and out of the tip end of the spout 14. The liquid will continue to flow from the spout until such time as the ball valve member 21 requires to move from the normal position shown in Figure 1 to a position against the valve seat 19, and when reaching the valve seat, the supply of liquid to the bore 13 is shut off. It will therefore be seen that the time interval that it takes the ball 21 to move from its normal position against the stop member 22 to the valve seat 19 controls the amount of liquid which will be dispensed on each inversion of the bottle. It therefore follows that by adjusting the stop member 22 in or out with respect to the tubular extension 16, the quantity of liquid dispensed on each inversion of the bottle may be accurately and predeterminedly controlled. The air vent tube 23 extends from the top of the body member 12 to a position adjacent the inner or lower end of the tubular extension 16, and as previously stated, this tube admits atmospheric air into the bottle as the liquid contents are dispensed therefrom.

In Figure 4 of the drawing, I have illustrated a slightly modified form of spiral track in which the numeral 24 designates the tubular extension equivalent to the extension 16 previously described. Fitted into the tubular extension 24 is a spiral wire spring 25, the convolutions of which are so spaced as to provide a spiral track for the spiral passage of a ball valve member 26.

In Figure 5 of the drawing a still further modified form of spiral track has been shown, and in this figure the numeral 27 designates the tubular extension in which is fitted a spiral metal ribbon 28, which ribbon may be anchored to the tubular extension 27 and the spaces between the convolutions so arranged as to provide a spiral track or groove 29 for the ball valve member 30.

From the foregoing description, it will be seen that I have provided a combined bottle stopper and liquid measuring device which may be fitted into the neck of a bottle to predeterminedly measure the amount of liquid poured therefrom upon each inversion of the bottle. The device consists of but a single moving part, namely the ball valve member and when interchanging the device from one bottle to another, the device may be thoroughly cleansed, for it is only necessary to remove the stop member 22 and ball 21, whereupon the device may be cleaned by placing the same beneath a water faucet.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:—

1. A device of the class described comprising in combination, a closure member having a pouring outlet passage therein, a valve seat at the inner end of said passage, a ball valve member, and spiral track means for guiding said ball valve member toward and away from said valve seat during alternate inversion of the device.

2. A device of the class described comprising in combination, a plug member having a pouring outlet passage, a tubular member extending from said plug member and into which the inner end of said passage opens, a valve seat at the inner end of said passage, said tubular member having inlet openings therein adjacent said valve seat, a spiral track within said tubular member, and a ball valve member disposed within said tubular member and movable over the spiral track toward and away from said valve seat during alternate inversions of the device.

3. A device of the class described comprising in combination, a plug member having a pouring outlet passage, a tubular extension member integral with and extending from the bottom inner end of said plug member and having communication with the inner end of said passage, a valve seat at the inner end of said passage, said tubular extension having inlet openings therein adjacent said valve seat, a spiral rib formed integral with said tubular extension to provide a spiral track therein, and a ball valve member disposed within said tubular extension and movable over the spiral track toward and away from said valve seat during alternate inversion of the device.

4. A device of the class described comprising in combination, a plug member having a pouring outlet passage, a tubular extension member integral with and extending from the bottom inner end of said plug member and having communication with the inner end of said passage, a valve seat at the inner end of said passage, said tubular extension having inlet openings therein adjacent said valve seat, a spiral wire fixedly disposed within said tubular extension, the convolutions of said spiral wire providing a spiral track, and a ball valve member disposed within said tubular extension and movable over the spiral track toward and away from said valve seat during alternate inversion of the device.

5. A device of the class described comprising in combination, a plug member having a pouring outlet passage, a tubular extension member integral with and extending from the bottom inner end of said plug member and having communication with the inner end of said passage, a valve seat at the inner end of said passage, said tubular extension having inlet openings therein adjacent said valve seat, a spiral metal ribbon element fixedly secured within said tubular extension, the convolutions of which are spaced to provide a spiral track, and a ball valve member disposed within said tubular extension and movable over the spiral track toward and away from said valve seat during alternate inversion of the device.

6. A device of the class described comprising in combination, a plug body, a tubular member extending from the bottom of said plug body, a spout extending from the top of said plug body, a pouring outlet passage extending from said tubular member through said plug member and spout to the tip end of the latter, a valve seat at the inner end of said passage, said tubular member having openings therein adjacent said valve seat, a spiral track provided on the inside of said tubular member, a ball valve member disposed within said tubular member and movable over said spiral track, and an adjustable stop member threaded in the tubular member for limiting the movement of the ball member in a direction away from said valve seat.

7. In a device of the class described, a tubular member having an opening in one end thereof and a valve seat surrounding said opening, a spiral track provided within said tubular member, and a ball valve member disposed within said tubular member and movable back and forth over said spiral track upon alternate inversion of the tubular member to cause said ball valve member to eventually seat against said valve seat when reaching the limit of its gravitational movement in one direction.

8. In a device of the class described, a tubular member having an opening in one end thereof and a valve seat surrounding said opening, a spiral track provided within said tubular member, and a ball valve member disposed within said tubular member and movable back and forth over said spiral track upon alternate inversion of the tubular member to cause said ball valve member to eventually seat against said valve seat when reaching the limit of its gravitational movement in one direction, and an adjustable stop member in the other end of said tubular member for limiting the movement of said ball valve member in an opposite direction.

9. A device of the class described comprising in combination, a plug member adapted to fit into the mouth of a bottle and having a pouring opening extending therethrough, a valve seat at the inner end of the pouring opening, a spiral guide track carried by the inner end of said plug member and disposed in axial alinement with said valve seat, and a ball valve member captively associated with said spiral guide track and movable back and forth thereover during alternate inversion of the device.

LOUIS KOUKAL.